(12) United States Patent
Kyllingstad

(10) Patent No.: US 8,416,093 B2
(45) Date of Patent: Apr. 9, 2013

(54) METHOD FOR DETECTION OF A FLUID LEAK RELATED TO A PISTON MACHINE

(75) Inventor: Age Kyllingstad, Algard (NO)

(73) Assignee: National Oilwell Norway AS, Stavanger (NO)

( * ) Notice: Subject to any disclaimer, the term of this patent is extended or adjusted under 35 U.S.C. 154(b) by 0 days.

(21) Appl. No.: 12/598,382

(22) PCT Filed: Apr. 18, 2008

(86) PCT No.: PCT/NO2008/000139
§ 371 (c)(1),
(2), (4) Date: Feb. 26, 2010

(87) PCT Pub. No.: WO2008/133524
PCT Pub. Date: Nov. 6, 2008

(65) Prior Publication Data
US 2011/0156921 A1 Jun. 30, 2011

(30) Foreign Application Priority Data
Apr. 30, 2007 (NO) .................................. 20072236

(51) Int. Cl.
*G08B 21/00* (2006.01)

(52) U.S. Cl. ......... 340/665; 340/605; 340/658; 340/635

(58) Field of Classification Search .................. None
See application file for complete search history.

(56) References Cited

U.S. PATENT DOCUMENTS

| 4,928,521 A | * | 5/1990 | Jardine ...................... 73/152.43 |
| 5,146,433 A | | 9/1992 | Kosmala |
| 5,206,816 A | * | 4/1993 | Hill et al. ........................ 702/56 |
| 5,687,075 A | * | 11/1997 | Stothers ......................... 700/28 |
| 5,767,665 A | * | 6/1998 | Morita et al. .............. 324/76.52 |
| 7,389,187 B2 | * | 6/2008 | Kersey et al. ................... 702/45 |

FOREIGN PATENT DOCUMENTS

WO 03/087754 10/2003
WO 2006/112721 10/2006

OTHER PUBLICATIONS

International Search Report and Written Opinion for App. No. PCT/NO2008/000139 dated Sep. 11, 2008 (7p.).

\* cited by examiner

*Primary Examiner* — Julie Lieu
(74) *Attorney, Agent, or Firm* — Conley Rose, P.C.

(57) ABSTRACT

A machine includes at least one piston and a pump shaft. A method for detecting a leak in the machine includes receiving a vibration signal from a vibration sensor disposed on at least one of an upstream pipe and a downstream pipe of the machine, receiving a rotational speed signal and an angular shaft position signal from a speed and position sensor disposed on the machine, calculating a rotational speed and an angular shaft position of the pump shaft, calculating at least one complex harmonic Fourier amplitude of the received vibration signal, low pass filtering the at least one complex harmonic Fourier amplitude, calculating a deviation amplitude as a magnitude of a complex difference between the filtered amplitude and a base amplitude, and monitoring the deviation amplitude to detect a leakage.

24 Claims, 2 Drawing Sheets

METHOD FOR DETECTION OF A FLUID LEAK RELATED TO A PISTON MACHINE

CROSS-REFERENCE TO RELATED APPLICATION

The present application claims priority to PCT/NO2008/000139 filed Apr. 18, 2008, which is hereby incorporated herein by reference in its entirety for all purposes, and claims the benefit of priority to Norwegian Application No. 20072236 filed on Apr. 30, 2007.

STATEMENT REGARDING FEDERALLY SPONSORED RESEARCH OR DEVELOPMENT

Not Applicable.

SUMMARY

This invention concerns detection of a fluid leak in relation to a piston machine. More specifically the invention concerns a method for detection of a fluid leak related to at least one piston machine, where the method includes:
  attaching a vibration sensor to at least one of the upstream pipe or the downstream pipe of the piston machine;
  measuring the vibration at the at least one vibration sensor;
  attaching a sensor to the at least one piston machine that renders a signal for calculating the rotational speed and shaft position of the at least one piston machine;
  calculating the rotational speed and angular shaft position of the at least one piston machine;
  calculating at least one complex harmonic Fourier amplitude of the measured vibration signal;
  low pass filtering said amplitude;
  calculating the deviation amplitude as the magnitude of a complex difference between said filtered amplitude and a base amplitude; and
  monitoring said deviation amplitude to detect a leakage.

Leakage in this context cover a wide range of malfunctions having in common that they lead to cyclic drops in the flow rate through the machine, relative to a normal situations with no defective components. Examples of such malfunctions are:
  piston seal failure;
  valve seal defects causing a reverse flow past the seal during the closing time of the seal; and
  a broken valve return spring causing an extended delay of valve closing.

Detection and localization of leaks related to piston machines (hereafter referred to as pumps, for simplicity) is important for minimizing costs and down time related to valve and piston failures. Today's practice offers no certain way to detect and localize leaks.

It is well known that a leak in one or more valves or pistons will cause a drop in the total flow and that this drop will, in turn, cause a drop also in the discharge pressure. However, such a pressure drop can also result from leaks outside the pump or even reductions in the flow resistance not re-lated to leaks. Such reductions can come from changes in fluid temperature and viscosity, or from a bypass of one or more flow restrictors. Therefore, a pressure drop cannot alone be used for localizing the leak.

A leak in a valve or piston manifests itself by several effects that can be picked up by various sensors. The most striking changes due to a growing leak are:

The discharge pressure starts dropping, provided that the loss in pressure is not compensated by an increase of the total pump rate.

The discharge pressure for a pump starts to vary cyclically with a period equal to the pump rotation period.

The suction pressure for a pump also starts to vary cyclically with the same period.

Low frequency and cyclic vibrations increase, especially on flexible hoses, both the high-pressure hose and the low-pressure hose.

All the mentioned leak indicators can be used, either as stand-alone indicators or in combination with the others.

It is well known that the lower harmonics of the pressure, especially the first and second harmonics, increase in magnitude as the leak develops and the reverse flow through one of the pistons or valves increases, see U.S. Pat. No. 5,720,597.

Experience has proved it difficult to normalize the first harmonic pressure component so that it is nearly independent of speed and mean pressure. This is due to the fact that a dynamic pressure is a complicated function of the frequency of the leak flow variations and the piping geometry, upstream piping geometry for the suction pressure and downstream piping geometry for the discharge pressure.

WO document 03/087754 describes a method using a combination of active speed variation tests and harmonic analysis to both quantify and localize leakage. Experience has shown, however, that this method does not work satisfactory in field environments.

The object of the invention is to increase the cost efficiency of recovery of petroleum from a reservoir rock formation.

The object is achieved according to the invention by the features as disclosed in the description below and the following patent claims.

A method according to the invention for detection of a fluid leak related to at least one piston machine includes:
  attaching a vibration sensor to at least one of the up-stream pipe or the downstream pipe of the piston machine;
  measuring the vibration at the at least one vibration sensor;
  attaching a sensor to the at least one piston machine that renders a signal for calculating the rotational speed and shaft position of the at least one piston machine;
  calculating the rotational speed and angular shaft position of the at least one piston machine;
  calculating at least one complex harmonic Fourier amplitude of the measured vibration signal;
  low pass filtering said amplitude;
  calculating the deviation amplitude as the magnitude of a complex difference between said filtered amplitude and a base amplitude; and
  monitoring said deviation amplitude to detect a leakage.

It is greatly advantageous to monitor the deviations of the dynamic variations instead of just the amplitudes. The reason is that the observed variations may consist of several components having different phases. Each component may be regarded as a vector, characterized by having both a length and direction, and the total dynamic component is the vector sum. It can often happen that the length of the vector sum is less than the length of the largest component.

As an example, imperfect balancing of the piston machine will cause a cyclic first harmonic motion. When a leak-induced motion is superimposed this unbalance motion it is not unlikely that the directions or phases differ by more than 90°, causing the resulting amplitude to drop when a leak develops. By monitoring the deviation amplitude instead of the resultant amplitude, a growing leak can be detected even though the resulting amplitude decreases.

Monitoring of deviations implies that reference or base values must be established before a deviation can be detected. The procedure for finding the base line values is discussed below.

The lower harmonics of the vibrations can be calculated in several ways. One method is to apply standard Fourier transform of a time record and pick the components corresponding to the pump harmonics. A more accurate method that is preferred if the pump speed and/or the sampling time intervals vary, is to use a Fourier analysis based on the measured angular shaft position as shown below.

Below, complex notation where $i=\sqrt{-1}$ is the imaginary unit, is utilized. The complex Fourier coefficients of a dynamic, time dependent variable f is given by $$F_k = \frac{1}{\pi}\int_0^{2\pi} f \cdot e^{ik\theta}\, d\theta \qquad (E1)$$
$$= \frac{1}{\pi}\int_0^{2\pi} f \cdot \cos(k\theta)\, d\theta + \frac{i}{\pi}\int_0^{2\pi} f \cdot \sin(k\theta)\, d\theta$$

where k is a positive integer representing the harmonics number. In principal, any harmonics of the vibration signal can be used as leak indicators, but the first harmonic is normally the most sensitive one and the most convenient to use. Unless otherwise stated it is assumed that k=1, and the harmonics index will be omitted, for convenience. The integrals must be implemented by summations in a computer, in accordance with well-known techniques for numerical integrations. The amplitudes are updated at every completed revolution of the pump.

The complex amplitude defined above may be regarded as a vector in the complex plane. The length of this vector, which equals the magnitude of the complex amplitude, is not suitable for early leak detection as the amplitude is disposed to fluctuations if there is much noise or non-harmonic variations present in the signal, and the signal may also include true harmonic variations that are not coming from a leak.

Applying a smoothing filter to the complex amplitude will effectively reduce the disturbances from of noise and non-harmonic variations. Smoothing, which is another word for low pass filtering, will dampen all components except the true harmonic components. A wide range of low pass filter types may be used. In general, the lower the cut-off frequency and the steeper the roll-off rate of the filter is, the more effectively the dampening is. However, the drawback of a very low cut-off frequency is a poor response time, meaning that detection of rapidly growing leaks is delayed.

Monitoring the deviation amplitude instead of the variation amplitude solves the problem of disturbing harmonic base variations not originating from a growing leak. The deviation amplitude is defined by $$\delta F = |F_s - F_b| \qquad (E2)$$

thus representing the magnitude or length of the complex difference between the smoothed amplitude $F_s$ and the base amplitude $F_b$. An alarm should be triggered when this deviation amplitude exceeds a certain alarm limit. The normal conditions not deviating too much from the base conditions are visualized as a hatched circular area in FIG. 2. Methods to find the base amplitude $F_b$ and the maximum deviation amplitude $\delta F$ are discussed below.

If the lowest harmonics from only one sensor is used, there is a risk that the deviation amplitude will respond poorly to a leak, because the sensor is placed close to a node of a standing wave, or the leak induced motion is polarized in a direction with low sensor sensitivity. To minimize this risk, the method above can be generalized to use multiple harmonics and/or multiple sensors. The additional sensors can either be at the same location but have different orientation, or they may be placed at different locations. From each combination of harmonics k and locations/orientations l a partial deviation amplitude $\delta F_{kl}$ is calculated, using the procedure outlined above. These partial amplitudes can conveniently be combined into one global deviation amplitude defined as the square root of a weighted sum of the partial deviations amplitudes squared:

$$\Delta F = \sqrt{\sum_{kl} w_{kl}(\delta F_{kl})^2} \qquad (E3)$$

where $w_{kl}$ are chosen weight factors. If all partial deviation amplitudes are expected to have the same order of amplitude, the weight factors can simply be a constant equal to unity divided by the number of combinations. Then the global variation amplitude is the rms value of all partial vibration amplitudes.

The method of using multiple vibration sensor signals can be further generalized to include harmonic pressure variations, measured either on the high pressure side and/or the low pressure side. The deviation amplitudes for the pressures can be found in the same way as the vibration deviation amplitudes, but they must be rescaled and transformed to equivalent displacement amplitudes by selecting a proper scaling factor. As an example, if a leak typically generates a deviation displacement amplitude of 1 mm and a first harmonic discharge pressure variation of 1 bar, the scaling factor for this pressure could be 1 mm/bar.

The main advantages of combining several harmonics and/or measurement signals into one global deviation amplitude are:
  the risk for hitting a condition or frequency with very low leak response is minimized; and
  the logics for triggering the leak alarm based on multiple signals is greatly simplified.

As mentioned under the discussion of prior art, the lower harmonics of the pump vibrations are closely related to the cyclic leak flow and to the corresponding variations of the suction pressure and the discharge pressure.

According to the invention a leak is detected, usually at an early stage, through monitoring the lowest vibration harmonics of the piping or flexible hoses. Preferably the vibration harmonics are calculated with reference to the angular position of each pump.

In a preferred embodiment a vibration sensor is attached to the most motion sensitive part of the piping, for instance outside the centre part of the high pressure flexible hose, and monitor the low frequency vibrations. The vibration sensor is typically an accelerometer, but velocity or displacement sensors can alternatively be used. Because acceleration amplitudes, in contrast to displacement amplitudes, tend to increase rapidly with the pump rotation speed, it is recommended to monitor the vibration amplitude in terms of displacement amplitude. The displacement amplitude can be de-rived even from an accelerometer signal by time integrating the raw signal twice before the harmonics analysis is applied. However, this method has the disadvantage that each integration step must be combined with a so-called AC filter to avoid uncontrolled growth of DC components or slowly varying noise components. To avoid this problem it is recommended to use a different procedure briefly outlined below.

It is well known for a skilled person that the Fourier transform of a time integrated variable equals the Fourier transform of the variable itself divided by the imaginary factor $i\omega$ where $\omega$ denotes the angular frequency. When the frequencies are restricted to pump harmonics only, we can put $\omega=k\Omega$, where k is the harmonics number and $\Omega$ is the angular rotation speed of the pump. Because displacement is the time integral of velocity, the displacement amplitude of harmonics no can be found from the corresponding velocity amplitude by dividing by $ik\Omega$. Similarly, the displacement amplitude can be found from the acceleration amplitude by dividing the latter by the same factor twice, or just $-(k\Omega)^2$ since $i^2=-1$.

Each of the leak indicators discussed above will have a base line that can change much with varying conditions, such as pump speed and discharge pressure. If these indicators shall be used for triggering leak alarms their normal bands or alarm limits cannot be fixed.

In a preferred embodiment the base values and alarm limits are set automatically by the following procedure:

When a substantial change in the flow conditions is encountered, for instance a change in the rotation speed of at least one of the pumps, a quarantine timer is started. The duration of the quarantine time must be sufficiently long to allow transient changes in the dynamic amplitudes to fade away, typically a few tens of seconds.

During this quarantine time the low pass filtered amplitudes are frozen, the transient changes are ignored and the alarm logic is disabled.

By the end of the quarantine time, a base estimation timer is started. The duration of this base estimation period is typically 2-10 times longer than the quarantine time.

At the end of the base estimation period the base values for the complex variation amplitudes are set equal to the average values measured during the base estimation period, and the alarm limits for the deviation amplitude are determined. The limits may be relative, which is set to a fraction of base value magnitude, or absolute. In a further embodiment the alarm limits can be determined from more advanced functions taking into account also the measured variations and extreme values.

After this base estimation period, and while the piston machines are running at steady conditions the alarm limits are kept constant, meaning that an alarm is set if the deviation amplitude, or the global deviation amplitude, exceed the alarm limit.

The automatic updating of base values and alarm values for the deviation amplitudes should preferably be carried out for all pumps even if the speed of only one pump is substantially changed. This is important as the total flow and discharge pressure may affect the base amplitudes for all running pumps.

The invention not only teaches a relatively simple method for detecting a leak, but also renders it possible to point out which pump is leaking.

BRIEF DESCRIPTION OF THE DRAWINGS

In the following there is described an example of use of the method illustrated in the accompanying drawings, in which.

DETAILED DESCRIPTION

Figure 1:
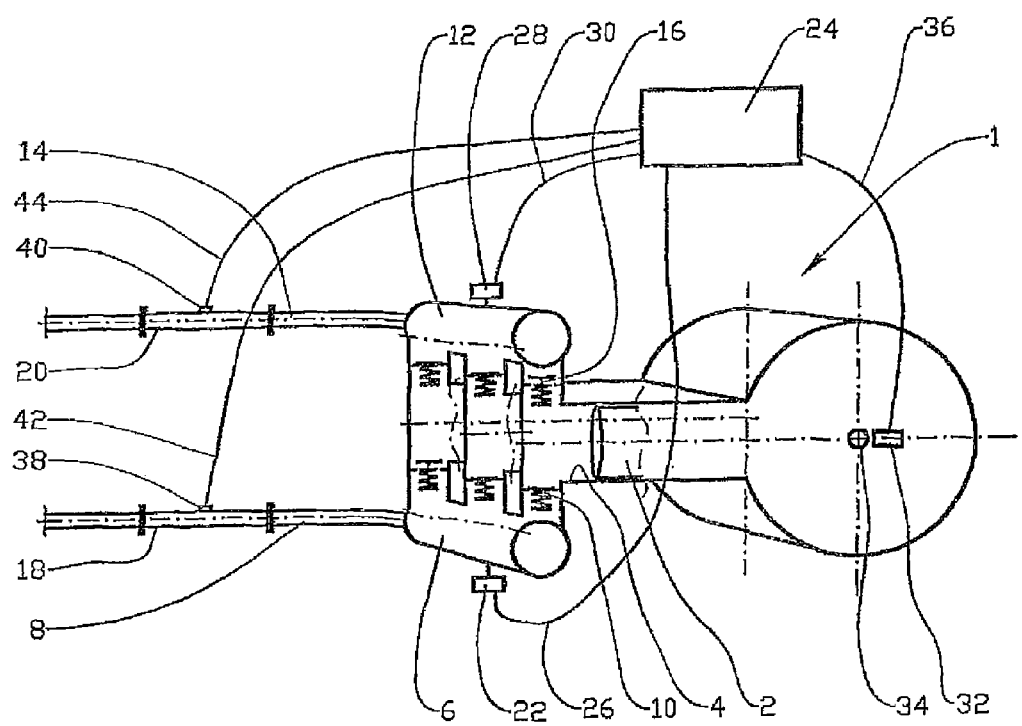
FIG. 1 schematically shows a pump with upstream and downstream pipe connections.

On the drawings the reference numeral 1 denotes a so-called triplex pump, below termed pump, provided with three individually acting pistons 2, extending through their respective cylinders 4. Only the first piston 2 and corresponding cylinder 4 is shown. The cylinders 4 communicate with an inlet manifold 6 and an upstream pipe 8 through their respective inlet valves 10, and an outlet manifold 12 and a downstream pipe 14 through their respective outlet valves 16.

A first flexible connection 18 is included in the upstream pipe 8 while a second flexible connection 20 is included in the downstream pipe 14.

An inlet pressure sensor 22 is connected to the inlet manifold 6, communicating with a computer 24 via a cable 26, and an outlet pressure sensor 28 is connected to the outlet manifold 12, communicating with the computer 24 via a cable 30. A rotational angle transmitter 32 is arranged to measure the rotational angle of a pump shaft 34 of the pump 1, and is communicatingly connected to the computer 24 by means of a cable 36.

A first vibration sensor 38 in the form of an accelerometer is connected to the first flexible connection 18, and a second vibration sensor 40, also in the form of an accelerometer, is connected to the second flexible connection 20. The vibration sensors 38 and 40 are coupled to the computer 24 by respective cables 42, 44. The first vibration sensor 38 and the second vibration sensor 40 may include more than one sensor as outlined in the general part of the description.

The sensors 22, 28, 38 and 40, the transmitter 32 and the computer 24 are of types that are known per se, and the computer is programmed to carry out the calculations in question.

In the event of a leak in a valve 10 or 16, or in a not shown packing of the piston 2, the discharge through the outlet valve 16 during the pumping phase will be reduced by a quantity equal to the leakage flow past the piston 2.

The leak past piston 2 induces an asymmetry into the flow trough the pump 1. The asymmetry sets up an increased vibration in the downstream pipe 14 including the second flexible connection 20. The second vibration sensor 40 senses the increased vibration.

By substantially continuously performing an angular position-based Fourier analysis of the vibration from the sensors 38, 40 as outlined in the general part of the description, an oncoming increase in the deviation amplitude $\delta F$ of the vibrations of the pump 1 will be detected.

Figure 2:
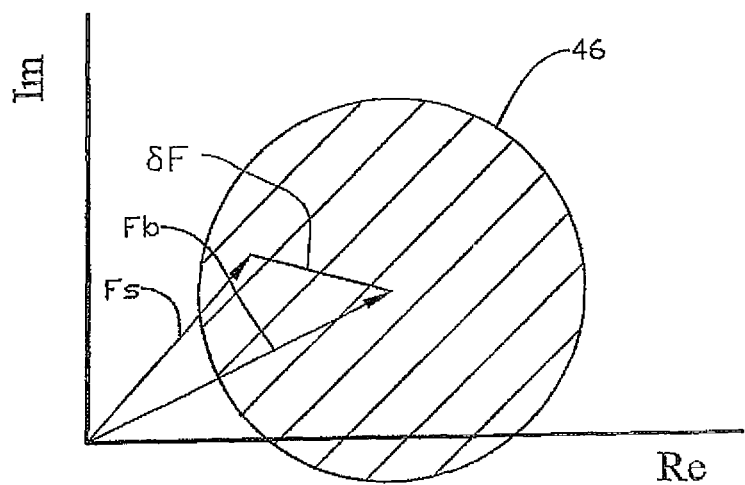
FIG. 2 shows a smoothed value and base value for the harmonic amplitude as vectors in the complex plane, and the alarm limit for deviations amplitude as the periphery of circle with its centre at the end of the base amplitude vector.

An alarm limit 46 is automatically set as lined out in the general part of the description. When deviation amplitude $\delta F$, see FIG. 2, reaches the alarm limit 48 the computer 24 will set an alarm, and in the case that more than one pump 1 are supplying the downstream pipe 14, also identify which pump 1 is leaking.

The identification of the leaky pump is most certain when the pumps run at different speeds, because the lower harmonics then have different and unique frequencies. However, leaky pump identification is also possible when two or more pumps are running synchronously, due to the fact that the change vibration level will be highest near the leaky pump.

The alarm set by the computer 24 may trigger a further investigation in order to locate the leak either in one of the pumps 1 if a frequency alarm is set, or elsewhere if only the normalized pressure alarm is set.

The invention claimed is:

1. A method for detection of a fluid leak related to a machine comprising at least one piston and a pump shaft, the method comprising:

receiving a vibration signal from a vibration sensor disposed on at least one of an upstream pipe and a downstream pipe of the machine;

receiving a rotational speed signal and an angular shaft position signal from a speed and position sensor disposed on the machine;

calculating a rotational speed and an angular shaft position of the pump shaft;

calculating at least one complex harmonic Fourier amplitude of the received vibration signal;

low pass filtering the at least one complex harmonic Fourier amplitude;

calculating a deviation amplitude as a magnitude of a complex difference between the filtered amplitude and a base amplitude; and monitoring the deviation amplitude to detect a leakage.

2. The method according to claim 1, wherein the method further comprises:

activating an alarm when the deviation amplitude exceeds an alarm limit.

3. The method according to claim 2, wherein the method further comprises:

setting the base amplitude automatically by the following procedure:

starting a quarantine time during which the transient changes in the harmonic amplitudes are ignored and the alarm logics are disabled when a substantial change in flow conditions is encountered; and determining the base value as an average of a harmonic amplitude measured during a base estimation time subsequently following the quarantine time.

4. The method according to claim 3, wherein the method further comprises:

determining the alarm limit for the deviation amplitude automatically as a function of the base amplitude.

5. The method according to claim 1, wherein the vibration sensor comprises an accelerometer.

6. The method according to claim 1, wherein the vibration sensor comprises a velocity sensor.

7. The method according to claim 1, wherein the vibration sensor comprises a displacement sensor.

8. The method according to claim 1, wherein the deviation amplitude is calculated from the filtered amplitude by dividing by a factor of $-(k\Omega)^2$, where k is a positive integer representing harmonic number of the complex harmonic Fourier amplitude, and $\Omega$ is the rotational speed of the pump shaft.

9. The method according to claim 1, wherein the deviation amplitude is calculated from the filtered amplitude by dividing by the factor $ik\Omega$ where $i=\sqrt{-1}$ is the imaginary unit, k is a positive integer representing harmonic number of the complex harmonic Fourier amplitude, and $\Omega$ is the rotational speed of the pump shaft.

10. The method according to claim 1, wherein the method further comprises:

deriving partial deviation amplitudes for at least two filtered amplitudes based on the same vibration sensor signal;

calculating a global deviation amplitude as a square root of a weighted sum of the partial deviation amplitudes squared; and monitoring the global deviation amplitude to detect a leakage in the machine.

11. The method according to claim 1, wherein the vibration sensor comprises at least two sensors that are in at least one of different locations and orientations, and the method further comprises:

deriving partial deviation amplitudes from each selected combination of filtered amplitudes and signals from the at least two vibration sensors;

calculating a global deviation amplitude as the square root of a weighted sum of the partial deviation amplitudes squared; and monitoring the global deviation amplitude to detect a leakage in the machine.

12. The method according to claim 1, wherein the method further comprises attaching at least one pressure sensor to at least one of an inlet manifold and an outlet manifold of the machine where the at least one pressure sensor measures the pressure variation at at least one location;

deriving partial pressure deviation amplitudes from each selected combination of filtered amplitudes and signals from the pressure sensors;

transforming the partial pressure deviation amplitudes into equivalent vibration deviation amplitudes by multiplying by proper transformation factors;

calculating a global deviation amplitude as the square root of a weighted square sum of the equivalent partial deviation amplitudes and vibration sensor based deviation amplitudes; and monitoring the global deviation amplitude to detect a leakage in said piston machine.

13. A machine, comprising:

at least one piston;

a shaft;

an upstream pipe and a downstream pipe;

a vibration sensor coupled to at least one of the upstream pipe and the downstream pipe;

a speed and position sensor configured to render a signal for calculating a rotational speed and an angular shaft position; and a computer in communication with the vibration sensor and the speed and position sensor, wherein the computer is configured to:

calculate the rotational speed and the angular shaft position from the signal from the speed and position sensor, calculate at least one complex harmonic Fourier amplitude of a signal from the vibration sensor, low pass filter the at least one complex harmonic Fourier amplitude, calculate a deviation amplitude as a magnitude of a complex difference between the filtered amplitude and a base amplitude, and activate an alarm when a magnitude of the deviation amplitude exceeds an alarm limit.

14. The machine of claim 13, wherein the vibration sensor comprises at least one of an accelerometer, a velocity sensor, and a displacement sensor.

15. The machine of claim 13, wherein the computer is configured to:

initiate, based on detection of at least a predetermined amount of change in flow conditions, a quarantine interval during which transient changes in harmonic amplitudes are ignored and alarm logics are disabled; and determine the base amplitude as an average of a harmonic amplitude measured during a base estimation time subsequently following the quarantine time.

16. The machine of claim 13, wherein the computer is configured to compute the deviation amplitude based on the filtered amplitude, the rotational speed, and a harmonic number.

17. The machine of claim 13, wherein the computer is configured to:

compute partial deviation amplitudes for a plurality of filtered amplitudes;

compute a global deviation amplitude as a square root of a weighted sum of the partial deviation amplitudes squared; and monitor the global deviation amplitude to detect a leakage in the machine.

18. The machine of claim 17, wherein the computer is configured to derive the plurality of filtered amplitudes from at least one of a plurality of harmonics, a plurality of sensors at different locations, and a plurality of sensors having different orientations.

19. The machine of claim 13, wherein the machine further comprises:

an inlet manifold;

an outlet manifold; and at least one pressure sensor, configured to measure pressure variation, attached to at least one of the inlet manifold and the outlet manifold;

wherein the computer is configured to:

compute partial pressure deviation amplitudes based on filtered amplitudes and signals from the pressure sensors;

transform the partial pressure deviation amplitudes into equivalent vibration deviation amplitudes by multiplying by transformation factors; and compute a global deviation amplitude based on the equivalent partial deviation amplitudes and vibration sensor based deviation amplitudes.

20. A system for detecting fluid leaks in a piston machine, comprising:

a computer configured to:

compute a complex harmonic Fourier amplitude of a vibration signal generated at at least one of an upstream pipe and a downstream pipe of the machine;

compute a deviation amplitude as a magnitude of a complex difference between a smoothed version of the complex harmonic Fourier amplitude and a reference amplitude;

detect leakage in the machine based on the deviation amplitude.

21. The system of claim 20, wherein the computer is configured to:

detect a change in flow conditions in the machine;

initiate, based on the detected change in flow conditions, a quarantine interval during which transient changes in harmonic amplitudes are ignored;

initiate a reference estimation interval subsequent to the quarantine interval; and compute the reference amplitude as an average of a harmonic amplitude measured during the reference estimation interval.

22. The system of claim 20, wherein the computer is configured to:

determine rotational speed of the machine based on measurement values provided by the machine; and compute the deviation amplitude based on the smoothed version of the complex harmonic Fourier amplitude, the rotational speed, and a harmonic number of a harmonic for which the complex harmonic Fourier amplitude is computed.

23. The system of claim 20, wherein the computer is configured to:

derive a plurality of smoothed complex harmonic Fourier amplitudes from at least one of a plurality of harmonics, a plurality of sensors at different locations, and a plurality of sensors having different orientations;

compute partial deviation amplitudes for the plurality of smoothed complex harmonic Fourier amplitudes;

compute a global deviation amplitude as a square root of a weighted sum of the partial deviation amplitudes squared; and monitor the global deviation amplitude to detect a leakage in the machine.

24. The system of claim 20, wherein the computer is configured to:

compute partial pressure deviation amplitudes based on smoothed complex harmonic Fourier amplitudes and manifold pressure measure measurements provided by the machine;

transform the partial pressure deviation amplitudes into equivalent vibration deviation amplitudes by multiplying by transformation factors; and compute a global deviation amplitude based on the equivalent partial deviation amplitudes and vibration sensor based deviation amplitudes.

\* \* \* \* \*

UNITED STATES PATENT AND TRADEMARK OFFICE
CERTIFICATE OF CORRECTION

PATENT NO. : 8,416,093 B2
APPLICATION NO. : 12/598382
DATED : April 9, 2013
INVENTOR(S) : Age Kyllingstad Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this

First Day of September, 2015

Michelle K. Lee
*Director of the United States Patent and Trademark Office*